United States Patent
Hayashi et al.

(10) Patent No.: US 12,489,310 B2
(45) Date of Patent: Dec. 2, 2025

(54) VEHICLE POWER SUPPLY CONTROL SYSTEM TO CONTROL POWER FROM A SOLAR PANEL AND AN AUXILIARY BATTERY, VEHICLE COMPRISING THE POWER SUPPLY CONTROL SYSTEM, AND METHOD OF CONTROLLING POWER SUPPLY FROM A SOLAR PANEL AND AN AUXILIARY BATTERY

(71) Applicant: TOYOTA JIDOSHA KABUSHIKI KAISHA, Toyota (JP)

(72) Inventors: Taisuke Hayashi, Miyoshi (JP); Yuma Miyamoto, Toyota (JP); Kohki Ohkoshi, Nagoya (JP); Takashi Fukai, Oobu (JP); Masahiro Takahashi, Toyota (JP); Akinori Kawamura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 713 days.

(21) Appl. No.: 17/815,991

(22) Filed: Jul. 29, 2022

(65) Prior Publication Data

US 2023/0063169 A1 Mar. 2, 2023

(30) Foreign Application Priority Data

Aug. 27, 2021 (JP) .................. 2021-139311

(51) Int. Cl.
| | | |
|---|---|---|
| *H02J 7/35* | (2006.01) | |
| *B60R 16/033* | (2006.01) | |
| *H02J 9/04* | (2006.01) | |
| *H02S 10/10* | (2014.01) | |
| *H02S 10/20* | (2014.01) | |
| *B60L 53/51* | (2019.01) | |

(52) U.S. Cl.
CPC .............. *H02J 7/35* (2013.01); *B60R 16/033* (2013.01); *H02J 9/04* (2013.01); *H02S 10/10* (2014.12); *H02S 10/20* (2014.12); *B60L 53/51* (2019.02)

(58) Field of Classification Search
CPC ....................................................... H02J 7/35
USPC ......................................................... 320/109
See application file for complete search history.

(56) References Cited

U.S. PATENT DOCUMENTS

| | | | |
|---|---|---|---|
| 2011/0234150 A1* | 9/2011 | Furukawa | ............... B60L 53/51 320/101 |
| 2016/0114693 A1 | 4/2016 | Tsuno | |
| 2018/0006470 A1* | 1/2018 | Stacey | .................... F21L 4/085 |

(Continued)

FOREIGN PATENT DOCUMENTS

| | | |
|---|---|---|
| JP | 2016086582 A | 5/2016 |
| JP | 2021065021 A | 4/2021 |

*Primary Examiner* — Yalkew Fantu
(74) *Attorney, Agent, or Firm* — Dickinson Wright, PLLC

(57) ABSTRACT

A vehicle power supply control system includes a solar panel, a drive battery, an auxiliary battery, an auxiliary system that is powered by the solar panel and the auxiliary battery, an acquisition unit, and a controller. The acquisition unit is configured to acquire power generated by the solar panel and power consumption of the auxiliary system. The controller is configured to control power supply from the solar panel to the drive battery based on the power generated by the solar panel and the power consumption of the auxiliary system when the power supply from the solar panel to the drive battery is possible.

13 Claims, 4 Drawing Sheets

(56) References Cited

U.S. PATENT DOCUMENTS

| | | | |
|---|---|---|---|
| 2019/0143835 A1* | 5/2019 | Hirano | B60L 58/20 307/9.1 |
| 2020/0338990 A1* | 10/2020 | Jang | B60L 58/20 |
| 2021/0107374 A1 | 4/2021 | Miyamoto | |

* cited by examiner

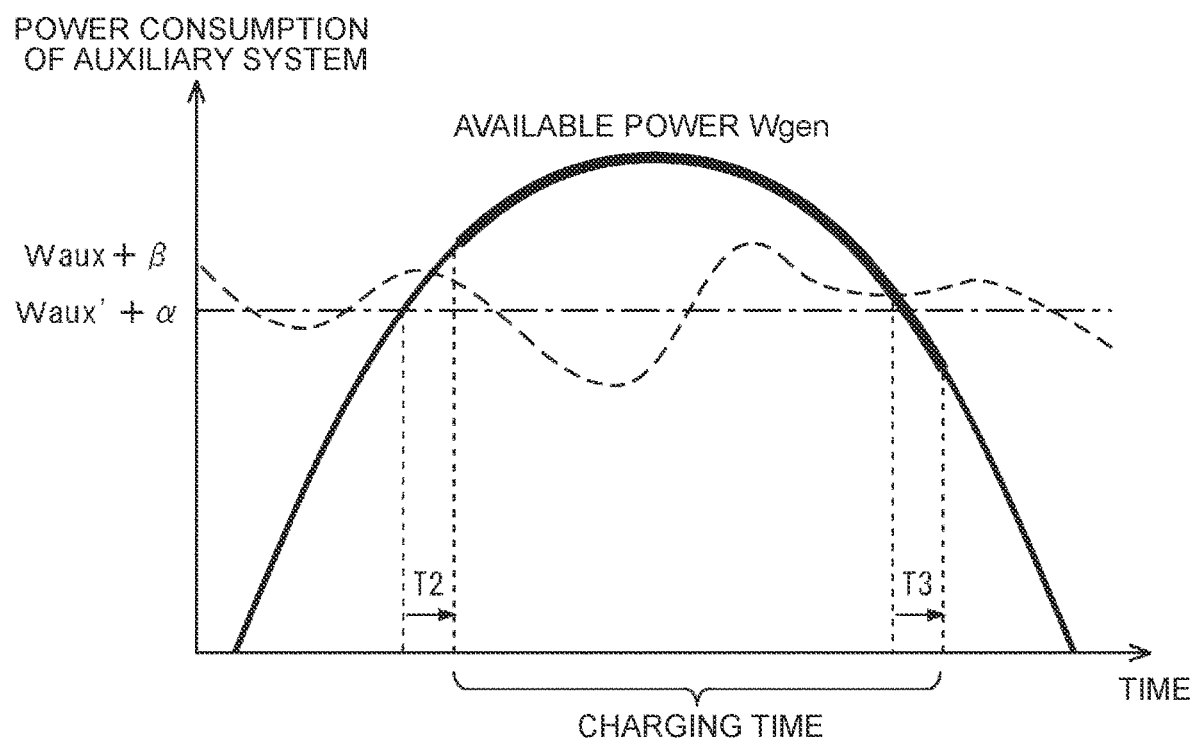

VEHICLE POWER SUPPLY CONTROL SYSTEM TO CONTROL POWER FROM A SOLAR PANEL AND AN AUXILIARY BATTERY, VEHICLE COMPRISING THE POWER SUPPLY CONTROL SYSTEM, AND METHOD OF CONTROLLING POWER SUPPLY FROM A SOLAR PANEL AND AN AUXILIARY BATTERY

CROSS-REFERENCE TO RELATED APPLICATION

This application claims priority to Japanese Patent Application No. 2021-139311 filed on Aug. 27, 2021, incorporated herein by reference in its entirety.

BACKGROUND

1. Technical Field

The present disclosure relates to vehicle power supply control systems that control supply of power generated by a solar panel mounted on a vehicle, vehicles equipped with this system, and power supply control methods that are performed by this system.

2. Description of Related Art

Japanese Unexamined Patent Application Publication No. 2021-065021 (JP 2021-065021 A) discloses a vehicle power supply control system. In this vehicle power supply control system, the ratio of the power that is supplied from one of a solar panel, a solar battery, and an auxiliary battery to a drive battery to the power that is supplied from one of the solar panel, the solar battery, and the auxiliary battery to an auxiliary system is controlled so that the amount of power that is supplied to the auxiliary system is greater when power consumption of the auxiliary system is equal to or higher than a predetermined value than when the power consumption of the auxiliary system is less than the predetermined value.

SUMMARY

The power consumption of the auxiliary system changes due to factors such as the type of actuator that actually operates and the temperature environment in which the vehicle is placed. Therefore, depending on the condition of the vehicle, it may be difficult to efficiently supply the power generated by the solar panel to the drive battery. Improvement in efficiency of power supply control is therefore desired.

The present disclosure provides a vehicle power supply control system, vehicle, and method that can efficiently supply power from a solar panel to a drive battery.

An aspect of the technique of the present disclosure relates to a vehicle power supply control system including: a solar panel; a drive battery; an auxiliary battery; an auxiliary system configured to be powered by the solar panel and the auxiliary battery; an acquisition unit configured to acquire power generated by the solar panel and power consumption of the auxiliary system; and a controller configured to control power supply from the solar panel to the drive battery based on the power generated by the solar panel and the power consumption of the auxiliary system when the power supply from the solar panel to the drive battery is possible.

According to the vehicle power supply control system etc. of the present disclosure, power can be efficiently supplied from the solar panel to the drive battery.

In the vehicle power supply control system according to the present disclosure, the controller may be configured to supply power from the solar panel to the drive battery when the power generated by the solar panel becomes equal to or greater than a sum of the power consumption of the auxiliary system and first power before first time elapses.

In the vehicle power supply control system according to the present disclosure, the controller may be configured to supply power from the solar panel to the drive battery when the power generated by the solar panel becomes equal to or greater than the sum of the power consumption of the auxiliary system and the first power before the first time elapses after start of power supply control for the drive battery In the vehicle power supply control system according to the present disclosure, the controller may be configured not to supply power from the solar panel to the drive battery when the power generated by the solar panel becomes less than a sum of the power consumption of the auxiliary system and second power.

In the vehicle power supply control system according to the present disclosure, the controller may be configured to start supplying power from the solar panel to the drive battery when the power generated by the solar panel is continuously equal to or greater than the sum of the power consumption of the auxiliary system and the first power for second time or more.

In the vehicle power supply control system according to the present disclosure, the controller may be configured to stop supplying power from the solar panel to the drive battery when the power generated by the solar panel is continuously less than the sum of the power consumption of the auxiliary system and the second power for third time or more.

An aspect of the technique of the present disclosure relates to a vehicle including a vehicle power supply control system. The vehicle power supply control system includes a solar panel, a drive battery, an auxiliary battery, an auxiliary system configured to be powered by the solar panel and the auxiliary battery, an acquisition unit configured to acquire power generated by the solar panel and power consumption of the auxiliary system, and a controller configured to control power supply from the solar panel to the drive battery based on the power generated by the solar panel and the power consumption of the auxiliary system when the power supply from the solar panel to the drive battery is possible.

An aspect of the technique of the present disclosure relates to a method that is performed by a vehicle power supply control system including a solar panel, a drive battery, an auxiliary battery, and an auxiliary system that is powered by the solar panel and the auxiliary battery. The method includes: acquiring power generated by the solar panel and power consumption of the auxiliary system; and controlling power supply from the solar panel to the drive battery based on the power generated by the solar panel and the power consumption of the auxiliary system when the power supply from the solar panel to the drive battery is possible.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 illustrates an example of charge control of a drive battery with power generated by power of a solar panel.

DETAILED DESCRIPTION OF EMBODIMENTS

A vehicle power supply control system using a solar panel according to the present disclosure controls charging of a drive battery with the power generated by the solar panel while, for example, a vehicle equipped with the vehicle power supply control system is parked. In this control, charging of the drive battery with the power generated by the solar panel is performed and stopped only when the power generated by the solar panel satisfies a predetermined condition that is based on the power consumption of an auxiliary system. This avoids losing the opportunity to charge the drive battery with the power generated by the solar panel, and increases the life of in-vehicle devices. Hereinafter, an embodiment of the present disclosure will be described in detail with reference to the drawings.

Figure 1:
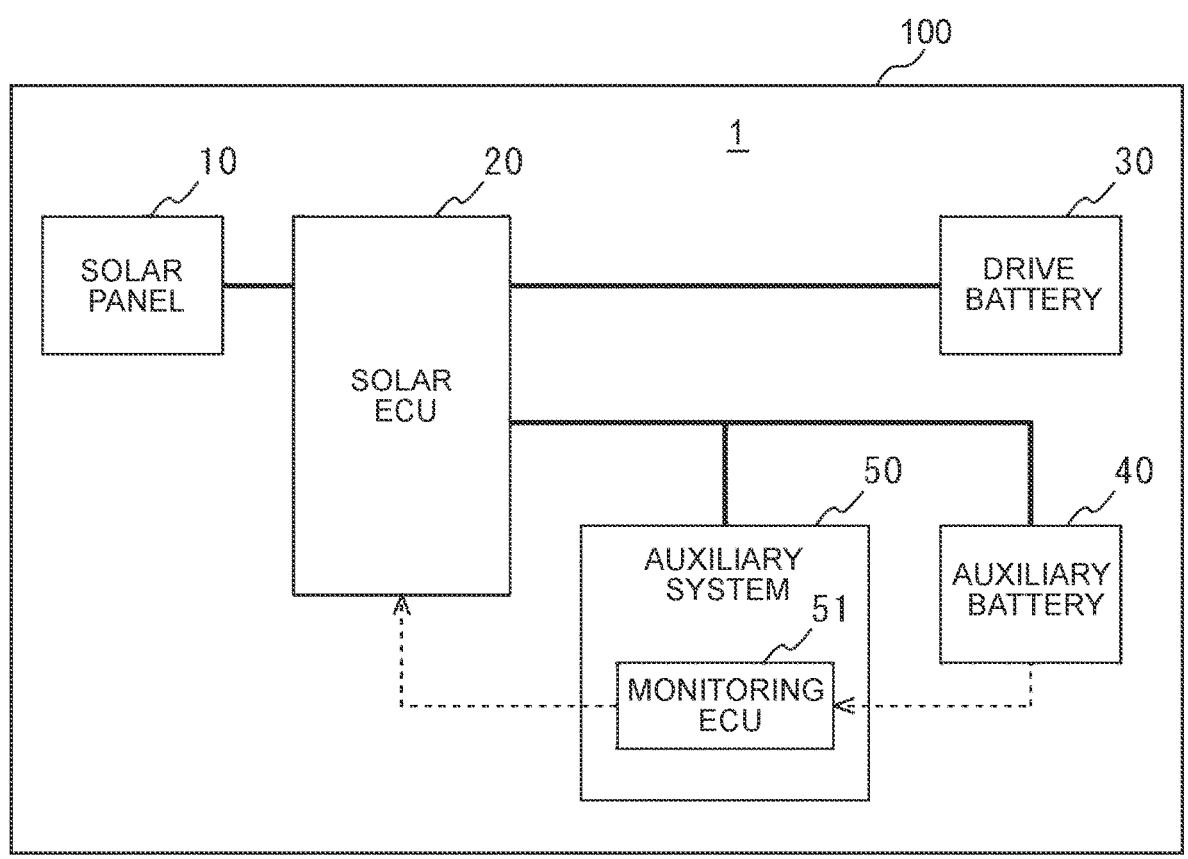
FIG. 1 is a block diagram of a vehicle power supply control system according to an embodiment.

FIG. 1 is a block diagram showing a schematic configuration of a vehicle power supply control system 1 according to an embodiment of the present disclosure. The vehicle power supply control system 1 illustrated in FIG. 1 includes a solar panel 10, a solar electronic control unit (ECU) 20, a drive battery 30, an auxiliary battery 40, and an auxiliary system 50. In FIG. 1, wires through which electric power is transmitted are shown by thick continuous lines, and wires through which control signals etc. other than electric power are transmitted are shown by thin dashed arrow lines. The vehicle power supply control system 1 is mounted on a vehicle 100 such as hybrid electric vehicle (HEV), plug-in hybrid electric vehicle (PHEV), and battery electric vehicle (BEV).

The solar panel 10 is a power generation device that receives sunlight to generate electricity, and is typically a photovoltaic module that is an assembly of photovoltaic cells. The amount of power that is generated by the solar panel 10 depends on the intensity of solar radiation. The power generated by the solar panel 10 is output to the solar ECU 20. The solar panel 10 may be installed on, for example, the roof (not shown) of the vehicle 100.

The solar ECU 20 is connected to the solar panel 10, the drive battery 30, the auxiliary battery 40, and the auxiliary system 50. The solar ECU 20 is an electronic control unit configured to control supply of the power generated by the solar panel 10 to the drive battery 30, the auxiliary battery 40, and the auxiliary system 50. In one example, the solar ECU 20 controls to supply the power generated by the solar panel 10 to the auxiliary battery 40 and the auxiliary system 50 (auxiliary system power supply mode) when the vehicle 100 can move. As used herein, "when the vehicle 100 can move" means, for example, when an ignition switch is on (IG-ON). The solar ECU 20 controls to supply the power generated by the solar panel 10 to the drive battery 30 (drive battery charge mode) when the vehicle 100 cannot move. As used herein, "when the vehicle 100 cannot move" means, for example, when the ignition switch is off (IG-OFF). The solar ECU 20 can calculate the power generated by the solar panel 10. The power generated by the solar panel 10 can be calculated from the measured values of a current sensor and a voltage sensor that are included in either or both of the solar panel 10 and the solar ECU 20. The solar ECU 20 of the present embodiment performs characteristic charge control for the drive battery 30 based on the state of both the power consumption of the auxiliary system 50 and the power generated by the solar panel 10 in the drive battery charge mode. The power consumption of the auxiliary system 50 and the power generated by the solar panel 10 are fed back from a monitoring ECU 51 that will be described later and input to the solar ECU 20. The charge control that is performed by the solar ECU 20 will be described later.

The solar ECU 20 has, as one of various control functions, a power saving function to save power when the vehicle 100 cannot move such as when the vehicle 100 is parked. That is, the solar ECU 20 can be switched between a mode in which all of the functions of the solar ECU 20 are activated and operated (wake-up mode) and a mode in which at least a part of the functions of the solar ECU 20 is operated and the remainder of the functions is stopped (sleep mode). Power consumption of the solar ECU 20 is lower in the sleep mode than in the wake-up mode as a part of the functions of the solar ECU 20 is stopped in the sleep mode.

The drive battery 30 is a rechargeable secondary battery such as lithium-ion battery or nickel metal hydride battery. The drive battery 30 is connected to the solar ECU 20 so that the drive battery 30 can be charged with the power generated by the solar panel 10. The drive battery 30 is connected to main equipment for driving the vehicle 100. The drive battery 30 is configured to supply power necessary for the operation of the main equipment. Examples of the main equipment include a starter motor and an electric traction motor.

The auxiliary battery 40 is a rechargeable secondary battery such as lithium-ion battery or lead-acid battery. The auxiliary battery 40 is connected to the solar ECU 20 so that the auxiliary battery 40 can be charged with the power generated by the solar panel 10. The auxiliary battery 40 is configured to supply power necessary for the operation of equipment (not shown) included in the auxiliary system 50.

The auxiliary system 50 includes various auxiliary equipment and systems mounted on the vehicle 100. The auxiliary equipment and systems included in the auxiliary system 50 run on the power generated by the solar panel 10 and the power stored in the auxiliary battery 40. Examples of the auxiliary equipment and systems include lighting equipment such as headlights and interior lights, air conditioning equipment such as heater and air conditioner, and systems for autonomous driving and advanced driver assistance. The auxiliary equipment and systems also include equipment and systems that are driven for the solar ECU 20 to perform the charge control, such as the monitoring ECU 51.

The monitoring ECU 51 is an electronic control unit configured to monitor the state of the auxiliary equipment and systems included in the auxiliary system 50 and the state of the auxiliary battery 40. For example, a hybrid vehicle ECU (HV-ECU) that controls hybrid operation of the vehicle 100 can be used as the monitoring ECU 51. The monitoring ECU 51 acquires the current flowing into the auxiliary battery 40 (input current) and the current flowing out of the auxiliary battery 40 (output current) as the state of the auxiliary battery 40. The monitoring ECU 51 also acquires the voltage (terminal voltage) of the auxiliary battery 40 as the state of the auxiliary battery 40. The monitoring ECU 51 can acquire the input and output currents and voltage of the auxiliary battery 40 by using a current sensor, a voltage sensor, etc. included in the auxiliary battery 40. The monitoring ECU 51 calculates the power actually consumed in the auxiliary system 50, based on the acquired input and output currents and voltage of the auxiliary battery 40, the power supplied from the solar panel 10, etc. The monitoring ECU 51 outputs information on the calculated power consumption of the auxiliary system 50 to the solar ECU 20.

The solar ECU 20 and the monitoring ECU 51 are typically composed of a part or all of a device including a processor, a memory, an input and output interface, etc. In this case, the solar ECU 20 and the monitoring ECU 51 implement various functions by the processor reading and executing programs stored in the memory.

Figure 2A:
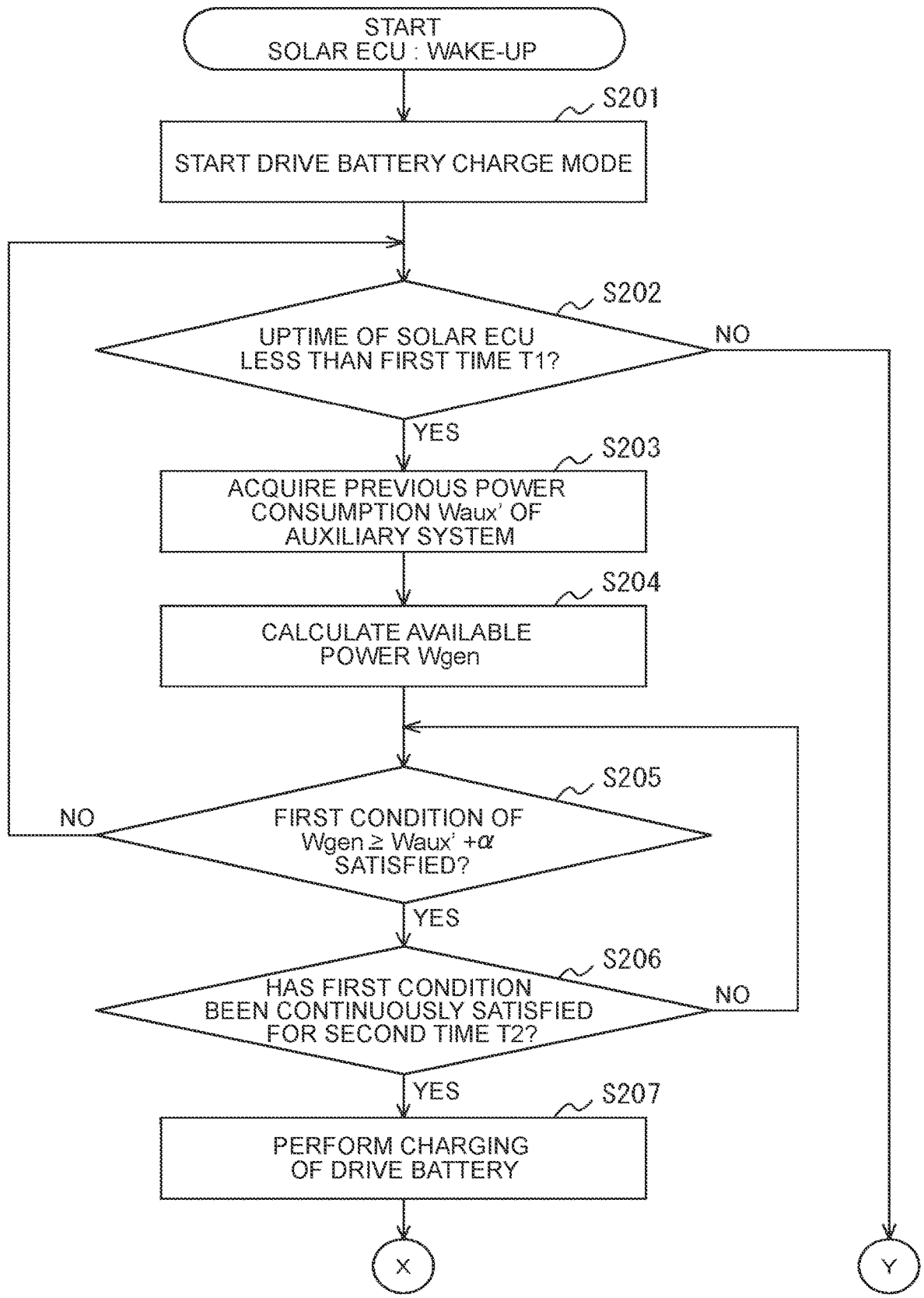
FIG. 2A is a processing flowchart of charge control that is performed by a solar electronic control unit (ECU)
Figure 2B:
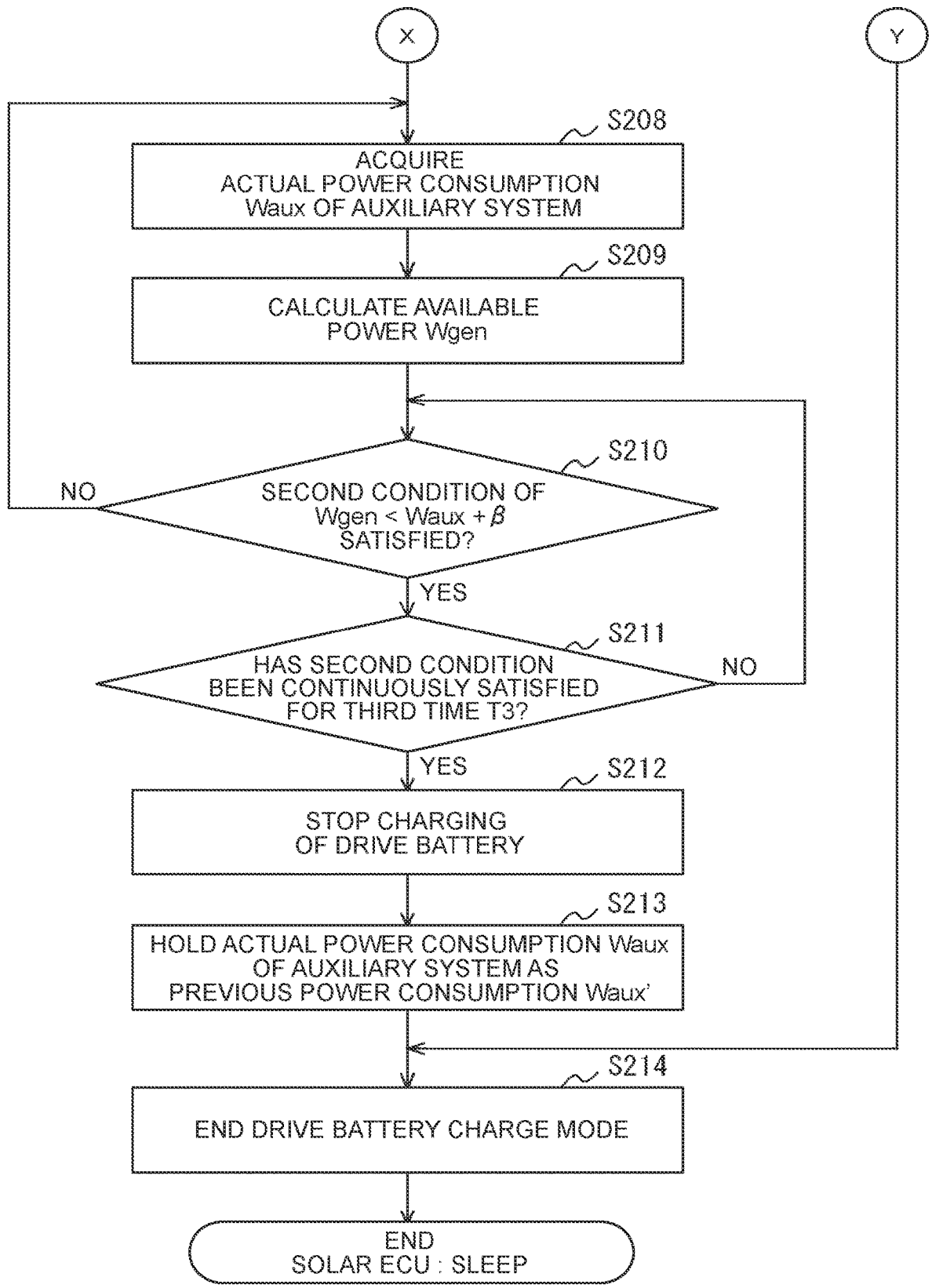
FIG. 2B is a processing flowchart of the charge control that is performed by the solar ECU.

Next, control that is performed by the vehicle power supply control system 1 according to the present embodiment will be described with reference to FIGS. 2A and 2B. FIGS. 2A and 2B are flowcharts illustrating a processing procedure of the charge control that is performed by the solar ECU 20 of the vehicle power supply control system 1. The process of FIG. 2A and the process of FIG. 2B are connected by connectors X and Y.

The charge control illustrated in FIGS. 2A and 2B is started when the solar ECU 20 in which a part of its functions has been stopped (sleep mode) is activated (wake-up mode) when the vehicle 100 cannot move such as when the vehicle 100 is parked.

In step S201, the solar ECU 20 starts the drive battery charge mode for controlling to supply the power generated by the solar panel 10 to the drive battery 30. In the drive battery charge mode, the drive battery 30 can be charged with the power generated by the solar panel 10. When the drive battery charge mode is started, the routine proceeds to step S202.

In step S202, the solar ECU 20 determines whether the uptime is less than predetermined first time T1. The uptime is the time that has elapsed since activation (wake-up) of the solar ECU 20. This determination is made in order to keep the solar ECU 20 from endlessly checking whether the solar panel 10 has been able to generate enough power for efficient charge control. Therefore, the first time T1 may be set based on the time required to at least check the power generated by the solar panel 10 and the power that is consumed by the solar ECU 20 during this checking process. When the uptime of the solar ECU 20 is less than the first time T1 (YES in step S202), the routine proceeds to step S203. When the uptime of the solar ECU 20 has reached the first time T1 (NO in step S202), the routine proceeds to step S214.

In step S203, the solar ECU 20 acquires the previous power consumption Waux'. The previous power consumption Waux' is the power actually consumed by the auxiliary system 50 in the previous charge control. The previous power consumption Waux' of the auxiliary system 50 is the power consumption of the auxiliary system 50 held in a memory (not shown) etc. in step S213 in the previous charge control. The solar ECU 20 cannot acquire the previous power consumption Waux' of the auxiliary system 50 (there is no previous power consumption Waux' held in the memory etc.) when the solar ECU 20 performs the charge control for the first time. The solar ECU 20 can therefore use a predetermined initial value when it performs the charge control for the first time. When the previous power consumption Waux' of the auxiliary system 50 is acquired, the routine proceeds to step S204.

In step S204, the solar ECU 20 calculates available power Wgen. The available power Wgen is the power the solar panel 10 can currently supply by power generation. The available power Wgen of the solar panel 10 can be calculated based on, for example, the closed circuit voltage and outflow current of the solar panel 10. When the available power Wgen of the solar panel 10 is calculated, the routine proceeds to step S205.

In step S205, the solar ECU 20 determines whether the available power Wgen of the solar panel 10 is equal to or greater than the sum of the previous power consumption Waux' of the auxiliary system 50 and predetermined first power $\alpha$. That is, the solar ECU 20 determines whether a "first condition" of Wgen$\geq$Waux'+$\alpha$ is satisfied. This determination is made in order to determine whether the solar panel 10 has been able to generate enough power for efficient charge control. For example, if the power generated by the solar panel 10 excluding the power consumption of the solar ECU 20 required to perform the charge control process is too small, the drive battery 30 cannot be efficiently charged. Accordingly, the first power $\alpha$ may be set to a value equal to or greater than the minimum power that allows efficient charging of the drive battery 30. When the first condition is satisfied (Wgen$\geq$Waux'+$\alpha$) (YES in step S205), the routine proceeds to step S206. On the other hand, when the first condition is not satisfied (Wgen<Waux'+$\alpha$) (NO in step S205), the routine returns to step S202.

In step S206, the solar ECU 20 determines whether the first condition (Wgen$\geq$Waux'+$\alpha$) has been continuously satisfied for predetermined second time T2. This determination is made in order to prevent a hunting phenomenon, namely a phenomenon in which the determination result of step S205 frequently changes due to, for example, repeated changes in available power Wgen of the solar panel 10 caused by unstable solar radiation etc. When the first condition has been continuously satisfied for the second time T2 (YES in step S206), the routine proceeds to step S207. On the other hand, when the first condition has not been continuously satisfied for the second time T2 (NO in step S206), the routine returns to step S205.

In step S207, the solar ECU 20 performs the process of charging the drive battery 30 with the available power Wgen of the solar panel 10. When the process of charging the drive battery 30 is performed, the routine proceeds to step S208.

The process from step S201 to step S207 is a drive battery charge start logic.

In step S208, the solar ECU 20 acquires actual power consumption Waux. The actual power consumption Waux is the power actually consumed by the auxiliary system 50 in the current charge control. The actual power consumption Waux of the auxiliary system 50 can be acquired from the monitoring ECU 51. Alternatively, the solar ECU 20 may acquire the output current and voltage of the auxiliary battery 40 from the monitoring ECU 51 and calculate the actual power consumption Waux of the auxiliary system 50 based on the acquired output current and voltage. When the actual power consumption Waux of the auxiliary system 50 is acquired, the routine proceeds to step S209.

In step S209, the solar ECU 20 calculates available power Wgen. The available power Wgen is the power the solar panel 10 can currently supply by power generation. The available power Wgen of the solar panel 10 can be calculated based on, for example, the closed circuit voltage and outflow current of the solar panel 10. When the available power Wgen of the solar panel 10 is calculated, the routine proceeds to step S210.

In step S210, the solar ECU 20 determines whether the available power Wgen of the solar panel 10 is less than the sum of the actual power consumption Waux of the auxiliary system 50 and predetermined second power $\beta$. That is, the solar ECU 20 determines whether a "second condition" of Wgen<Waux+β is satisfied. This determination is made in order to determine whether the solar panel 10 can no longer generate enough power for efficient charge control. For example, when the power generated by the solar panel 10 minus the power consumption of the solar ECU 20 required to perform the charge control process becomes low, the drive battery 30 cannot be efficiently charged. Accordingly, the second power β may be set to a value equal to or greater than the minimum power that allows efficient charging of the drive battery 30. The second power β may have the same value as the first power α, or may have a different value from the first power α. When the second condition is satisfied (Wgen<Waux+β) (YES in step S210), the routine proceeds to step S211. On the other hand, when the second condition is not satisfied (Wgen≥Waux+β) (NO in step S210), the routine returns to step S208.

In step S211, the solar ECU 20 determines whether the second condition (Wgen<Waux+β) has been continuously satisfied for predetermined third time T3. This determination is made in order to prevent a hunting phenomenon, namely a phenomenon in which the determination result of step S210 frequently changes due to, for example, repeated changes in available power Wgen of the solar panel 10 caused by unstable solar radiation etc. The third time T3 may have the same value as the second time T2, or may have a different value from the second time T2. When the second condition has been continuously satisfied for the third time T3 (YES in step S211), the routine proceeds to step S212. On the other hand, when the second condition has not been continuously satisfied for the third time T3 (NO in step S211), the routine returns to step S210.

In step S212, the solar ECU 20 stops the process of charging the drive battery 30 with the available power Wgen of the solar panel 10. When the process of charging the drive battery 30 is stopped, the routine proceeds to step S213.

In step S213, the solar ECU 20 holds the current actual power consumption Waux of the auxiliary system 50 as the previous power consumption Waux' of the auxiliary system 50. More specifically, the solar ECU 20 stores the power consumption of the auxiliary system 50 immediately before charging of the drive battery 30 is stopped as the previous power consumption Waux'. When the previous power consumption Waux' of the auxiliary system 50 is held, the routine proceeds to step S214.

In step S214, the solar ECU 20 ends the drive battery charge mode for controlling to supply the power generated by the solar panel 10 to the drive battery 30. When the drive battery charge mode ends, the solar ECU 20 switches to the inactive (sleep) mode, and the charge control ends.

The process from step S208 to step S214 is a drive battery charge end logic.

An example of the charge control of the drive battery 30 with the power generated by the solar panel 10 will be described with further reference to FIG. 3. FIG. 3 shows an example in which the available power Wgen of the solar panel 10 changes quadratically with time.

As can be understood from the example of FIG. 3, in the vehicle power supply control system 1, the charge control of the drive battery 30 with the power generated by the solar panel 10 is performed during a charge period (portion shown by a thick continuous line), namely a period from when the available power Wgen (continuous line) of the solar panel 10 first continuously satisfies the first condition (long dashed short dashed line) that is a static condition for the second time T2 (Wgen≥Waux'+α) until the available power Wgen continuously satisfies the second condition (dashed line) that is a dynamic condition for the third time T3 (Wgen<Waux+β).

As described above, in the vehicle power supply control system 1 according to the embodiment of the present disclosure, the solar ECU 20 performs the charge control of the drive battery 30 with the power generated by the solar panel 10 when the available power Wgen of the solar panel 10 is continuously equal to or greater than the sum of the previous power consumption Waux' of the auxiliary system 50 and the first power α (first condition is continuously satisfied) for the second time T2 in the drive battery charge mode.

By this control, even when the power generated by the solar panel 10 is small, the charge control of the drive battery 30 is performed when efficient charging of the drive battery 30 is possible (when the previous power consumption Waux' is low and the available power Wgen therefore satisfies the first condition). This avoids losing the opportunity to charge the drive battery 30 with the power generated by the solar panel 10. Accordingly, the efficiency of the vehicle power supply control system 1 is improved.

In the vehicle power supply control system 1 according to the embodiment of the present disclosure, the solar ECU 20 stops the charge control of the drive battery 30 with the power generated by the solar panel 10 when the available power Wgen of the solar panel 10 is continuously less than the sum of the actual power consumption Waux of the auxiliary system 50 and the second power β (second condition is continuously satisfied) for the third time T3 after the solar ECU 20 performs the charge control of the drive battery 30 with the power generated by the solar panel 10.

By this control, even when the power generated by the solar panel 10 is large, the charge control of the drive battery 30 is stopped when efficient charging of the drive battery 30 is impossible (when the actual power consumption Waux is high and the available power Wgen therefore satisfies the second condition). This avoids a situation in which the power generated by the solar panel 10 is used to charge the drive battery 30 and shortage of power supply to the auxiliary system 50 is covered by the auxiliary battery 40. As a result, an unnecessary increase in number of charges of the drive battery 30 can be reduced, and the number of activations of the equipment and systems of the auxiliary system 50 in association with the charge control of the drive battery 30 can be reduced. This leads to an increase in life of in-vehicle devices including the equipment and systems of the auxiliary system 50.

Although one embodiment of the technique of the present disclosure is described above, the present disclosure should be construed not only as the vehicle power supply control system but also as a charge control method, a control program for the method, a computer readable non-transitory storage medium storing the control program, a vehicle including the vehicle power supply control system, etc.

The vehicle power supply control system of the present disclosure is applicable to, for example, vehicles equipped with a solar panel.

What is claimed is:
1. A vehicle power supply control system comprising:
a solar panel;
a drive battery;
an auxiliary battery;
an auxiliary system configured to be powered by the solar panel and the auxiliary battery; and
an electronic control unit configured to acquire an amount of power generated by the solar panel and an amount of power consumption of the auxiliary system, and control power supply from the solar panel to the drive battery based on the power generated by the solar panel and the power consumption of the auxiliary system in a drive battery charge mode, wherein power supply from the solar panel to the drive battery is possible in the drive battery charge mode, wherein the electronic control unit is configured to supply power from the solar panel to the drive battery in a case that the power generated by the solar panel becomes equal to or greater than a sum of a previous power consumption of the auxiliary system and a predetermined first power before a first time elapses after start of power supply control for the drive battery, the previous power consumption of the auxiliary system being power consumed by the auxiliary system in a last drive battery charge mode.

2. The vehicle power supply control system according to claim 1, wherein the controller is configured not to supply power from the solar panel to the drive battery in a case that the power generated by the solar panel becomes less than a sum of an actual power consumption of the auxiliary system and second power after starting to supply power from the solar panel to the drive battery.

3. The vehicle power supply control system according to claim 1, wherein the controller is configured to start supplying power from the solar panel to the drive battery in a case that the power generated by the solar panel is continuously equal to or greater than the sum of the previous power consumption of the auxiliary system and the first power for a second time or more before the first time elapses after the start of power supply control for the drive battery.

4. The vehicle power supply control system according to claim 2, wherein the controller is configured to stop supplying power from the solar panel to the drive battery when the power generated by the solar panel is continuously less than the sum of the actual power consumption of the auxiliary system and the second power for a third time or more.

5. The vehicle power supply control system of claim 1, wherein the electronic control unit is further configured to supply power generated by the solar panel to the auxiliary battery and the auxiliary system when the vehicle is in a mode in which the vehicle can move.

6. The vehicle power supply control system of claim 1, wherein the solar panel comprises a solar electronic unit, and the electronic control unit implements a power saving mode in which a part of functions of the solar electronic control unit is operated and a remainder of functions of the solar electronic control unit is stopped when the vehicle is in a mode in which the vehicle cannot move.

7. The vehicle power supply control system of claim 6, wherein the mode in which the vehicle cannot move comprises the vehicle being parked.

8. The vehicle power supply control system of claim 1, further comprising a second electronic control unit configured to monitor a state of the auxiliary system, and to calculate a power consumption of the auxiliary system.

9. The vehicle power supply control system of claim 1, wherein in the drive battery charge mode, an ignition switch of the vehicle is set to OFF.

10. The vehicle power supply control system of claim 1, wherein the electronic control unit stores a power consumption of the auxiliary system immediately before charging of the drive battery is stopped as the previous power consumption.

11. The vehicle power supply control system of claim 1, wherein when the drive battery charge mode ends, the electronic control unit switches to an inactive mode.

12. A vehicle comprising a vehicle power supply control system, the vehicle power supply control system including:
a solar panel;
a drive battery;
an auxiliary battery;
an auxiliary system configured to be powered by the solar panel and the auxiliary battery; and
an electronic control unit configured to
acquire an amount of power generated by the solar panel and an amount of power consumption of the auxiliary system, and
control power supply from the solar panel to the drive battery based on the power generated by the solar panel and the power consumption of the auxiliary system in a drive battery charge mode, wherein power supply from the solar panel to the drive battery is possible in the drive battery charge mode,
wherein the electronic control unit is configured to supply power from the solar panel to the drive battery in a case that the power generated by the solar panel becomes equal to or greater than a sum of a previous power consumption of the auxiliary system and a predetermined first power before a first time elapses after start of power supply control for the drive battery, the previous power consumption of the auxiliary system being power consumed by the auxiliary system in a last drive battery charge mode.

13. A method that is performed by a vehicle power supply control system, the vehicle power supply control system including a solar panel, a drive battery, an auxiliary battery, and an auxiliary system that is powered by the solar panel and the auxiliary battery, the method comprising:
acquiring an amount of power generated by the solar panel and an amount of power consumption of the auxiliary system;
controlling power supply from the solar panel to the drive battery based on the power generated by the solar panel and the power consumption of the auxiliary system in a drive battery charge mode, wherein power supply from the solar panel to the drive battery is possible in the drive battery charge mode, and
supplying power from the solar panel to the drive battery in a case that the power generated by the solar panel becomes equal to or greater than a sum of a previous power consumption of the auxiliary system and a predetermined first power before a first time elapses after start of power supply control for the drive battery, the previous power consumption of the auxiliary system being power consumed by the auxiliary system in a last drive battery charge mode.

* * * * *